United States Patent [19]

Konushi et al.

[11] Patent Number: 6,104,597
[45] Date of Patent: Aug. 15, 2000

[54] THIN-FILM CAPACITOR

[75] Inventors: Shigeo Konushi; Fumio Fukumaru, both of Kokubu, Japan

[73] Assignee: Kyocera Corporation, Kyoto, Japan

[21] Appl. No.: 09/087,063

[22] Filed: May 29, 1998

[30] Foreign Application Priority Data

| May 30, 1997 | [JP] | Japan | 9-141757 |
| Jul. 25, 1997 | [JP] | Japan | 9-200485 |
| Sep. 29, 1997 | [JP] | Japan | 9-264564 |

[51] Int. Cl.$^7$ .................................................. H01G 4/30
[52] U.S. Cl. .................. 361/301.4; 361/312; 361/306.3; 338/204
[58] Field of Search ........................ 361/301.4, 303–305, 361/328, 306.1, 306.2, 306.3, 308.1, 309, 311–313, 321.2, 766, 763; 338/204, 309, 308; 257/724, 924, 532, 303, 306, 536–537

[56] References Cited

U.S. PATENT DOCUMENTS

| 3,248,620 | 4/1966 | Haft et al. | 361/313 |
| 3,273,033 | 9/1966 | Rossmeisl | 361/313 |
| 3,398,326 | 8/1968 | Swart et al. | 361/795 |
| 3,838,320 | 9/1974 | Klein | 361/303 |
| 4,434,452 | 2/1984 | Hamabe et al. | 361/304 |

*Primary Examiner*—Dean A. Reichard
*Assistant Examiner*—Anthony Dinkins
*Attorney, Agent, or Firm*—Hogan & Hartson LLP

[57] ABSTRACT

A thin-film capacitor having a first and a second capacitor element disposed on a substrate substantially on the same plane adjacent to each other and laterally spaced in a direction along the plane. Each capacitor includes a dielectric layer and two electrode layers formed on the upper and lower side of the dielectric layer, respectively. The upper electrode layer of the first capacitor and the lower electrode layer of the second capacitor are electrically connected, and lower electrode layer of the first capacitor and the upper electrode layer of the second capacitor are electrically connected, via connection terminal electrodes. A plurality of such thin-film capacitors may be laminated, or placed side-by-side on the substrate.

6 Claims, 8 Drawing Sheets

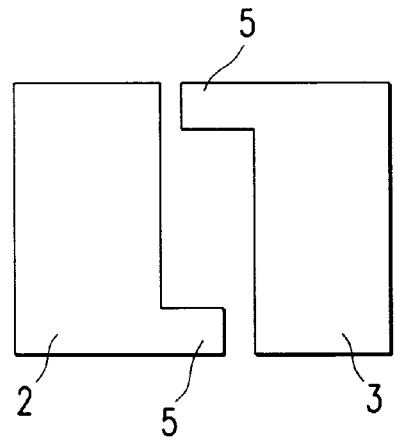
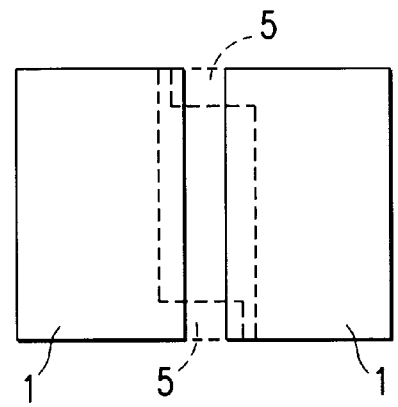
FIG. 4A  FIG. 4B
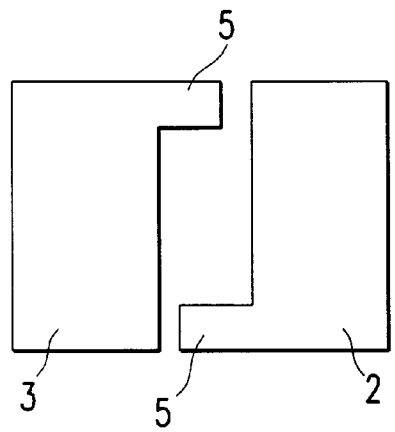
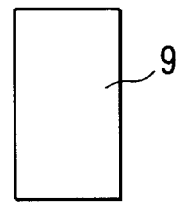
FIG. 4C  FIG. 4D

THIN-FILM CAPACITOR

BACKGROUND OF THE INVENTION

1. Field of the Invention

The present invention relates to a thin-film capacitor such as the one having a large capacity and a low inductance, that is arranged, for example, in an electric circuit that operates at high speeds for bypassing high-frequency noise or for preventing fluctuation in the power-source voltage.

2. Description of the Prior Art

The modern trend toward fabricating electronic equipment in ever small sizes maintaining ever high functions, has strongly urged a reduction in the size and thickness of the electronic parts incorporated in the electronic equipment yet satisfying the requirement of operation at high frequencies.

In a high-speed digital circuit in a computer that must process large quantity of data at high speeds, in particular, the clock frequency in a CPU chip is as high as from 100 MHz to several hundred MHz, and the clock frequency on the bus among the chips is as high as from 30 MHz to 75 MHz even on a level of personal computers.

To cope with an increase in the degree of integration of LSI and an increase in the number of elements in the chip, furthermore, it has been attempted to lower the power-source voltage in order to suppress the consumption of electric power. Accompanying an increase in the operation speed, an increase in the density and a decrease in the voltage in the integrated circuits, passive parts such as capacitors must be produced in small sizes yet having large capacities and exhibiting excellent properties at high frequencies and for high-speed pulses.

In order to realize a capacitor of a small size having a large capacity, it is most effective to decrease the thickness of a dielectric held between a pair of electrodes into the form of a thin film. Forming a thin film is suited for lowering the voltage.

Problems that stem from high-speed operation of the ICs are more serious than problems that stem from decreasing the sizes of the elements. Among them, what is particularly important in removing high-frequency noise, which is the role of a capacitor, is a function for suppressing an instantaneous drop in the power-source voltage that occurs when the logic circuits are simultaneously changed over by instantaneously supplying energy stored in the capacitor. The capacitor having such a function is a so-called decoupling capacitor.

Performance required for the decoupling capacitor is how quickly an electric current can be supplied in response to a change in the current in the load unit which is quicker than a clock frequency. Therefore, the capacitor must reliably function in a frequency region of from 100 MHz to 1 GHZ.

In practice, however, the capacitor possesses a resistance component and an inductance component in addition to an electrostatic capacitance component. The impedance of capacitance component decreases with an increase in the frequency, and the inductance component increases with an increase in the frequency. As the operation frequency increases, therefore, a transient current supplied by the inductance of the element is limited, resulting in an instantaneous drop in the power-source voltage on the side of the logic circuit or in the occurrence of new voltage noise. As a result, an error occurs on the logic circuit.

In the modern LSIs, in particular, the power-source voltage has been lowered to suppress the consumption of electric power despite an increase in the total number of elements, and the width of allowable change in the power-source voltage has been narrowed. In order to minimize the width of change in the voltage during the high-speed operation, therefore, it is very important to decrease the inductance possessed by the decoupling capacitor itself.

The inductance can be decreased by three methods. A first method is to minimize the length of a current path. A second method is to form a current path in a loop structure and to minimize the sectional area of the loop. A third method is to divide the current path into n segments to decrease the effective inductance into 1/n.

The first method is effected by decreasing the size by increasing the capacity per a unit area, and is accomplished by preparing a capacitor element in the form of a thin film. In order to obtain a capacitor having a large capacity and favorable high-frequency characteristics, Japanese Laid-Open Patent Publication No. 94716/1985 discloses a dielectric in the form of a thin film having a thickness of not larger than 1 $\mu$m.

The second method is to decrease the inductance by canceling a magnetic field formed by a current path by utilizing a magnetic field formed by another adjacent current path. This is done by directing a pair of electrodes forming a capacitor not in the same direction as much as possible or by directing the currents flowing into the electrodes not in the same direction as much as possible.

According to the third method, the divided capacitors are connected in parallel in order to decrease the inductance. As a capacitor of this kind, Japanese Laid-Open Patent Publication No. 211191/1992 discloses the one which utilizes a thin dielectric layer.

When a decoupling capacitor that can be mounted on a desired place is taken into consideration, however, the size that can be handled must not be smaller than about 0.5 mm×0.5 mm. Therefore, limitation is imposed on the first method of decreasing the inductance relying simply upon decreasing the thickness of the film and decreasing the size.

According to the second method, the positive and negative terminal electrodes must be arranged on the same end surface or in the directions at right angles with each other, which is disadvantageous from the standpoint of mounting.

The third method of division and parallel connection is advantageous when the capacitor is contained in the substrate without, however, offering freedom for mounting. The ordinary laminated-layer type capacitors are connected in parallel, but the directions of the currents are the same, and electric fields formed by the electrode currents are superposed. That is, the mutual inductance so increases that the effective total inductance is not decreased to a sufficient degree. Therefore, a second means must be employed in combination. As described above, the terminal electrodes bring about a problem from the standpoint of mounting.

SUMMARY OF THE INVENTION

The object of the present invention therefore is to provide a thin-film capacitor having a low-inductance structure which can be easily mounted and easily laminated.

According to the present invention, there is provided a thin-film capacitor comprising a first capacitor element and a second capacitor element arranged close to each other, wherein:

said first capacitor element includes a dielectric layer, a first electrode layer formed on the upper surface of said dielectric layer, and a second electrode layer formed on the lower surface of said dielectric layer and having a polarity different from that of said first electrode layer;

said second capacitor element includes a dielectric layer, the first electrode layer formed on the lower surface of said dielectric layer, and the second electrode layer formed on the upper surface of said dielectric layer; and said first electrode layers of said first capacitor element and said second capacitor element are electrically connected together, and said second electrode layers of said first capacitor element and said second capacitor element are electrically connected together, via connection terminal electrodes, respectively.

According to the present invention, furthermore, there is provided a capacitor assembly in which a plurality of thin-film capacitors are arranged maintaining a suitable distance, the first electrode layers of the thin-film capacitors are electrically connected together, and the second electrode layers of the thin-film capacitors are electrically connected together, via capacitance take-out conductors (terminals), respectively.

BRIEF DESCRIPTION OF THE DRAWINGS

FIG. 4 is a view illustrating planar shapes of the members constituting the thin-film capacitor of FIG. 1;

DETAILED DESCRIPTION OF THE INVENTION

In a thin-film capacitor of the present invention, if briefly described, a pair of capacitor elements (first capacitor element and second capacitor element) are arranged maintaining a predetermined distance and, hence, a first electrode layer (e.g., positive electrode layer) and a second electrode layer (e.g., negative electrode layer) are formed on the same plane. This makes it possible to decrease the distance between the electrode layers of different polarities on the same plane and, hence, to shorten the effective current path and to decrease the inductance.

Moreover, the currents flow in the opposite directions through the positive electrode layer and the negative electrode layer of the capacitor elements to cancel the inductance to a small level.

In the thin-film capacitor of the present invention, furthermore, the electrode layers of the same polarity are electrically connected together through connection terminal electrodes formed at opposing portions on the same plane, making it possible to easily obtain the capacitor in a laminated-layer structure. Besides, it is allowed to form an external terminal electrode on the uppermost electrode layer facilitating the mounting.

According to the present invention, furthermore, it is allowed to provide a resistor layer on the uppermost electrode layer of either one or both of the capacitor elements. The resistor layer has a resistance greater than the series resistance in the capacitor element. A circuit provided with the thin-film capacitor having such a resistor layer exhibits a stabilized equivalent series resistance and effectively prevents the operation from losing stability and from abnormally oscillating.

The invention will now be described in detail by way of embodiments shown in the accompanying drawings.

Figure 1:
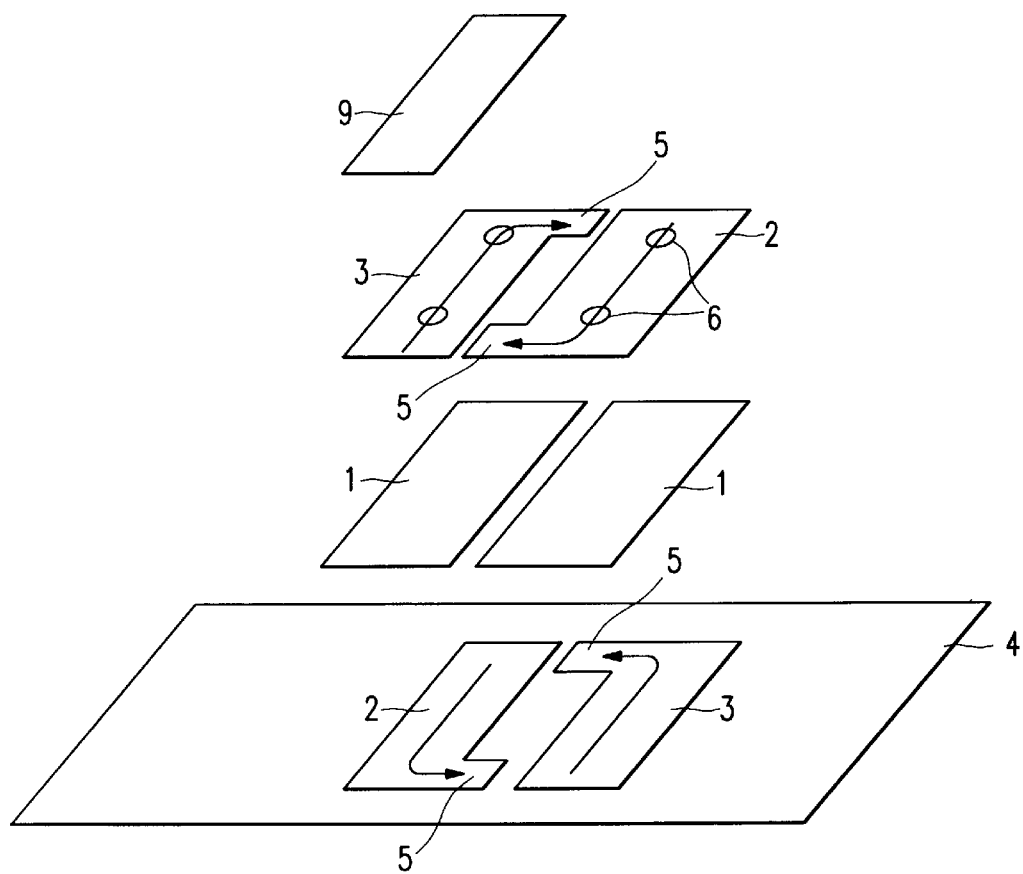
FIG. 1 is a perspective view illustrating, in a disassembled manner, a single-plate type thin-film capacitor of the present invention.
Figure 2:
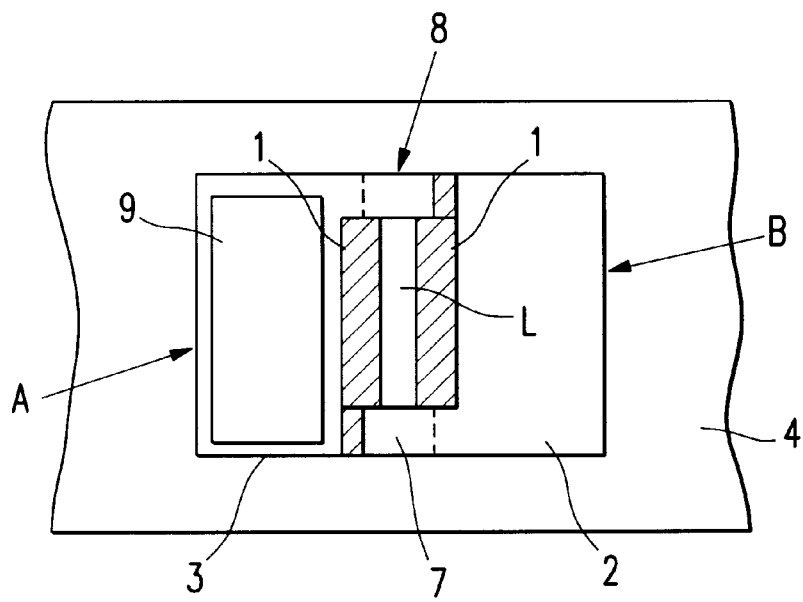
FIG. 2 is a plan view of the thin-film capacitor of FIG. 1.
Figure 3:
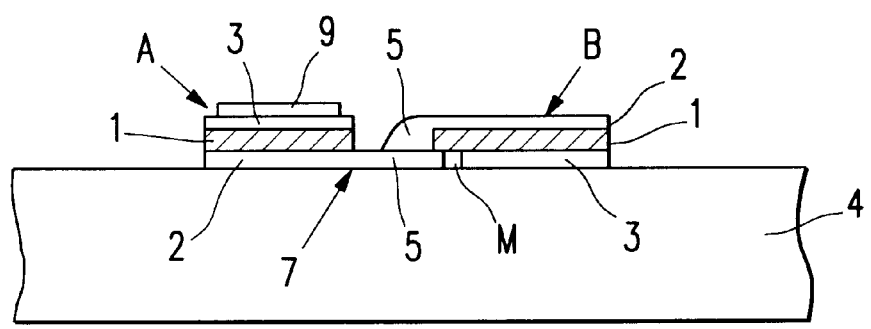
FIG. 3 is a side sectional view of the thin-film capacitor of FIG. 1.

FIGS. 1 to 3 are diagrams illustrating a thin-film capacitor of a single-plate type according to the present invention.

In these drawings, a pair of capacitor elements A and B are arranged in an opposing manner in parallel forming a positive electrode layer 2 (first electrode layer) and a negative electrode layer 3 (second electrode layer) on the upper and lower surfaces of the dielectric layer 1. The electrode layers formed at positions in the pair of capacitor elements, which positions are in the same plane and are opposed to each other, have different polarities.

As required, furthermore, a resistor layer 9 is formed on the uppermost negative electrode layer 3. The capacitor elements A and B are formed on the upper surface of the substrate 4.

That is, in the capacitor element A, the positive electrode layer 2 is formed on the lower surface of the dielectric layer 1, and the negative electrode layer 3 is formed on the upper surface of the dielectric layer 1. In the capacitor element B, the negative electrode layer 3 is formed on the lower surface of the dielectric layer 1, and the positive electrode layer 2 is formed on the upper surface of the dielectric layer 1. The capacitor elements A and B are arranged in parallel maintaining a predetermined distance. The negative electrode layer 3 of the capacitor element B is formed in flush with the positive electrode layer 2 of the capacitor element A, and the positive electrode layer 2 of the capacitor element B is formed in flush with the negative electrode layer 3 of the capacitor element A.

The positive electrode layer 2 and the negative electrode layer 3 of the pair of capacitor elements A and B have connection terminal electrodes 5 protruding toward the opposing capacitor elements A and B. The connection terminal electrodes 5 of the electrode layers 2, 3 having the same polarity are connected together.

A positive electrode connection portion 7 where the positive electrode layers 2 are connected together, and a negative electrode connection portion 8 where the negative electrode layers 3 are connected together, are separated apart from each other maintaining a predetermined distance, and are thus insulated.

FIG. 4 shows planar shapes of the electrode layers 2, 3, the dielectric layers 1, and a resistor layer 9 that is provided as required, for constituting the thin-film capacitor that comprises the above-mentioned capacitor elements A and B. That is, as shown in FIG. 4, the positive electrode layer 2 and the negative electrode layer 3 have a rectangular shape (FIGS. 4(a) and 4(c)), and the dielectric layer 1 has a rectangular shape of a size that covers the positive electrode layer 2 or the negative electrode layer 3 formed on the lower surface of the dielectric layer 1 (FIG. 4(b)). The resistor layer 9 has a rectangular shape which is slightly smaller than the negative electrode layer 3 formed on the lower surface thereof (FIG. 4(d)). The dielectric layers 1 are separated apart from each other maintaining a predetermined distance. The positive electrode layer 2 or the negative electrode layer 3 formed on the upper surface of the dielectric layer 1 has the same shape and same size as the positive electrode layer 2 or the negative electrode layer 3 formed on the lower surface of the dielectric layer 1.

The dielectric layer 1 has a thickness of, for example, from 0.1 to 1 μm and a size of 1.2 mm long and 1.2 mm wide. The electrode layers 2 and 3 have a thickness of from 0.1 to 1 μm and a size of 1.0 mm long and 0.3 mm wide. The resistor layer 9 has a thickness of from 0.01 to 1 m and a size of 0.8 mm long and 0.2 μmm wide.

The thicknesses and sizes of the layers can be suitably changed depending upon the materials and the applications.

A dielectric material same as the dielectric layer 1 may be filled in a portion (indicated by L in FIG. 2) between the positive electrode connection portion 7 and the negative electrode connection portion 8. In this case, the dielectric layers 1 of the pair of capacitor elements A and B are connected together to assume an H-shape as viewed on a plane. The dielectric material same as the dielectric layer 1 may also be filled in a portion (indicated by M in FIG. 3) between the positive electrode layer 2 and the negative electrode layer 3, and between the positive electrode connection portion 7 and the negative electrode connection portion 8.

The thin-film capacitor of the present invention has external electrode terminals 6 (see FIG. 1) that are connected by a suitable method such as soldering to the positive electrode layer 2 and to the negative electrode layer 3 formed on the outermost surfaces of the capacitor elements A and B, so that the capacitance can be taken out.

As the substrate 4, there can be used alumina, sapphire, single crystalline MgO or single crystalline $SrTiO_3$, etc. Among them, it is desired to use alumina or sapphire since they react little with the thin film, are cheaply available and are strong, and from the standpoint of crystalline property of the dielectric films or the electrode films.

The electrode layers 2 and 3 are formed of thin films of platinum (Pt), gold (Au), palladium (Pd) or copper (Cu). Among them, it is most desired to use thin films of platinum (Pt) and gold (Au) or thin films of copper (Cu) having a small resistance. In particular, Pt and Au react little with the dielectric layer and are little oxidized, least permitting a phase of a low dielectric constant to be formed in the interface relative to the dielectric layer.

The resistor layer 9 that is formed as required may be made of any material provided its resistance can be adjusted to be from 0.1 to 100 ohms by changing the thickness and the size. Its examples include tantalum nitride or metals such as Ta, W, Rh, Nb, Cr and Cr-Ni having high resistivities. These resistors are prepared by a known method such as PVD method.

The dielectric layer 1 may exhibit a high dielectric constant in a high-frequency region, and it is desired that its film thickness is not larger than 1 μm. It is further desired that the dielectric layer 1 comprises a dielectric thin film of perovskite-type composite oxide crystals containing Pb, mg and Nb as metal elements, and exhibits a dielectric constant of not smaller than 1000 at a frequency of 300 MHz (at room temperature). It is also allowable to form a dielectric layer 1 by using perovskite-type composite oxide crystals containing Ba and Ti, or by using PZT, PLZT, $SrTiO_3$ or $Ta_2O_3$. Such a dielectric layer can be formed by a widely known method such as CVD method, PVD method, sol-gel method or the like method.

In the thus constituted thin-film capacitor, the pair of capacitor elements A and B are formed being opposed to each other. Therefore, the positive electrode layers 2 and the negative electrode layers 3 are formed in flush maintaining a predetermined distance in the pair of capacitor elements A and B, making it possible to shorten the distance between positive electrode layers 2 and negative electrode layers 3 and, hence, to shorten the effective current path and to decrease the inductance.

Besides, the currents flow in the opposite directions through the positive electrode layer 2 and the negative electrode layer 3 in each of the capacitor elements. Accordingly, the inductance is canceled between the positive electrode layer 2 and the negative electrode layer 3, and is decreased to a small level. In FIG. 1, a chief current path of when no resistor layer 9 is formed is indicated by arrows. In FIG. 1, reference numeral 6 denotes external terminal electrodes.

The external terminal electrode 6 for connection to an external unit can be formed on the uppermost electrode layers 2, 3, facilitating the mounting.

When the resistor layer 9 is provided, the external terminal electrode 6 may be provided on the resistor layer 9. When the resistor layer 9 is provided, furthermore, the resistance is adjusted so that the circuit will not lose stability in the operation or will not abnormally oscillate.

Figure 5:
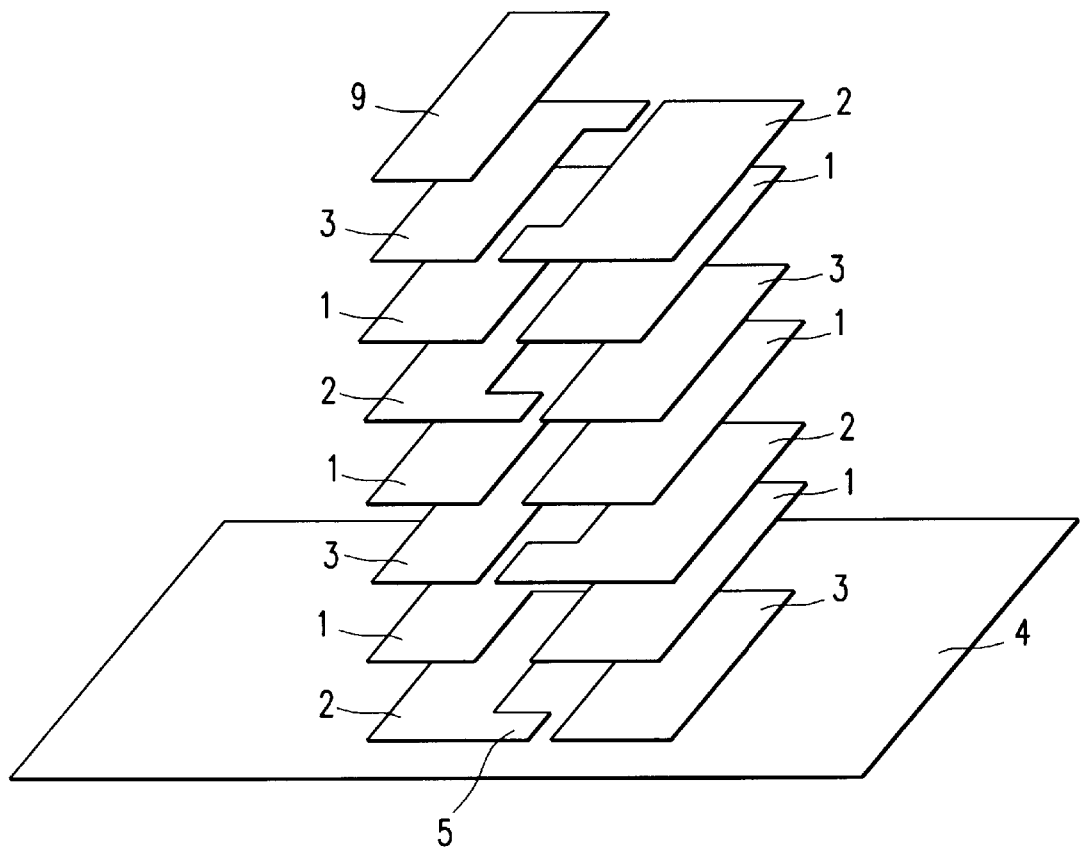
FIG. 5 is a perspective view illustrating, in a disassembled manner, a laminated-layer type thin-film capacitor according to the present invention.

FIGS. 1 to 3 have illustrated a thin-film capacitor of the single-plate type. FIG. 5 illustrates a thin-film capacitor of the laminated-layer type.

In the thin-film capacitor of the laminated-layer type as shown in FIG. 5, a pair of capacitor elements A and B are arranged on a substrate 4, the pair of capacitor elements A and B being formed by alternatingly laminating electrode layers 2, 3 and a dielectric layer 1, and the electrode layers 2 and 3 alternatingly serving as a positive electrode layer 2 and a negative electrode layer 3 in the direction in which they are laminated. As required, a resistor layer 9 is formed on the uppermost negative electrode layer 3 of the capacitor element A. The electrode layers 2 and 3 formed at opposing positions of the pair of capacitor elements A and B have dissimilar polarities. Besides, the positive electrode layers 2 and the negative electrode layers 3 of the pair of capacitor elements A and B have connection terminal electrodes 5 formed being protruded toward the opposing capacitor elements A, B. The connection terminal electrodes 5 of the electrode layers 2 and 3 having the same polarity are electrically connected together in the same manner as in FIGS. 1 to 3.

Like the thin-film capacitor of the single-plate type having a structure as shown in FIGS. 1 to 3, the thin-film capacitor of the laminated-layer type having a structure as shown in FIG. 5 features a decreased inductance due to a shortened effective current path and the cancelation of inductance between the electrode layers 2 and 3. Besides, provision of an external terminal electrode (not shown) on the uppermost layer makes the mounting easy.

When the resistor layer 9 is provided, furthermore, the circuit is effectively prevented from losing stability in the operation and from abnormally oscillating. In the embodiments of FIGS. 1 to 3 and 5, the resistor layer 9 is formed on the uppermost electrode layer of either one of the capacitor elements. However, the resistor layer 9 may be provided on the uppermost electrode layer of the other capacitor element or on the uppermost electrode layers of both capacitor elements.

The above-mentioned thin-film capacitors shown in FIGS. 1 to 3 or FIG. 5 can be used in the form of an assembly being connected in a plural number in parallel. In this case, the current path is distributed into a number of n (n is the number of the capacitors), and the effective inductance becomes 1/n times and is further decreased.

Figure 6:
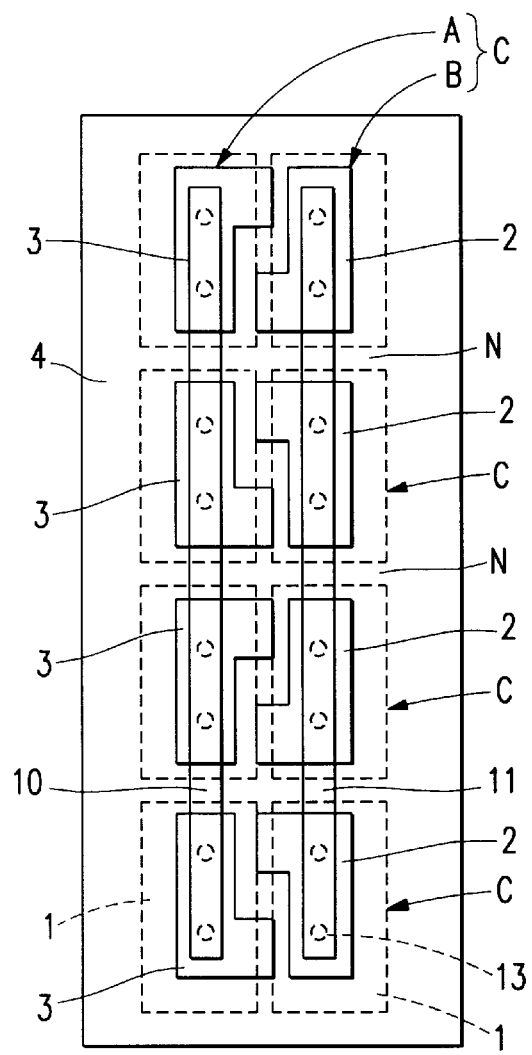
FIG. 6 is a plan view of a capacitor assembly obtained by connecting the thin-film capacitors of FIG. 1 in parallel.
Figure 7:
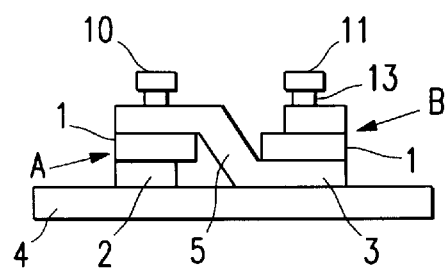
FIG. 7 is a side sectional view of a capacitor element for constituting the assembly of FIG. 6.

FIG. 6 illustrates a capacitor assembly in which four thin-film capacitors of a structure shown in FIG. 1 are arranged in parallel on a predetermined substrate, and FIG. 7 is a side sectional view of a capacitor portion (a thin film capacitor) constituting the assembly.

In the capacitor assembly as shown in FIG. 6, four thin film capacitors C each constituted by a pair of capacitor elements A and B are arranged in line maintaining a predetermined distance so as to be insulated from each other. The material same as the dielectric layer 1 may be filled in the portions N among the four capacitor elements. In this case, the dielectric layers 1 among the capacitors C are coupled together.

The uppermost positive electrode layers 2 and the uppermost negative electrode layers 3 of the four capacitor elements are electrically connected together through capacitance take-out conductors (terminals) 10 and 11. The terminals 10 and 11 are made of thin plate-like conductors, and are connected to the electrode layers via junction portions 13. For easy comprehension in FIG. 6, the dielectric layers 1 are shown by broken lines, but electrode layers 2 and 3 on the lower surfaces of the dielectric layers 1 are not shown.

The junction portions 13 may be in any one of the forms of bumps, foils, plates, wires or paste, or may be a combination thereof without any particular limitation. The junction portions 13 may be formed of an electrically conducting material such as solder, Au, Cu, Pt, Pd, Ag, Al, Ni or electrically conducting resin, or may be a comb-nation of these materials. The material of the terminals 10 and 11 is the same as that of the junction portions 13. Though the terminals 10 and 11 are formed of thin plates, the uppermost positive electrode layers 2 and the uppermost negative electrode layers 3 may be connected together through wire members such as lead wires.

In this capacitor assembly, each thin film capacitor C has a single-plate type structure as shown in FIGS. 1 to 3. However, the capacitor C may have a laminated-layer structure as shown in FIG. 5, as a matter of course According to this capacitor assembly, the current path is divided into four making it possible to decrease the effective inductance down to one-fourth.

Figure 9A:
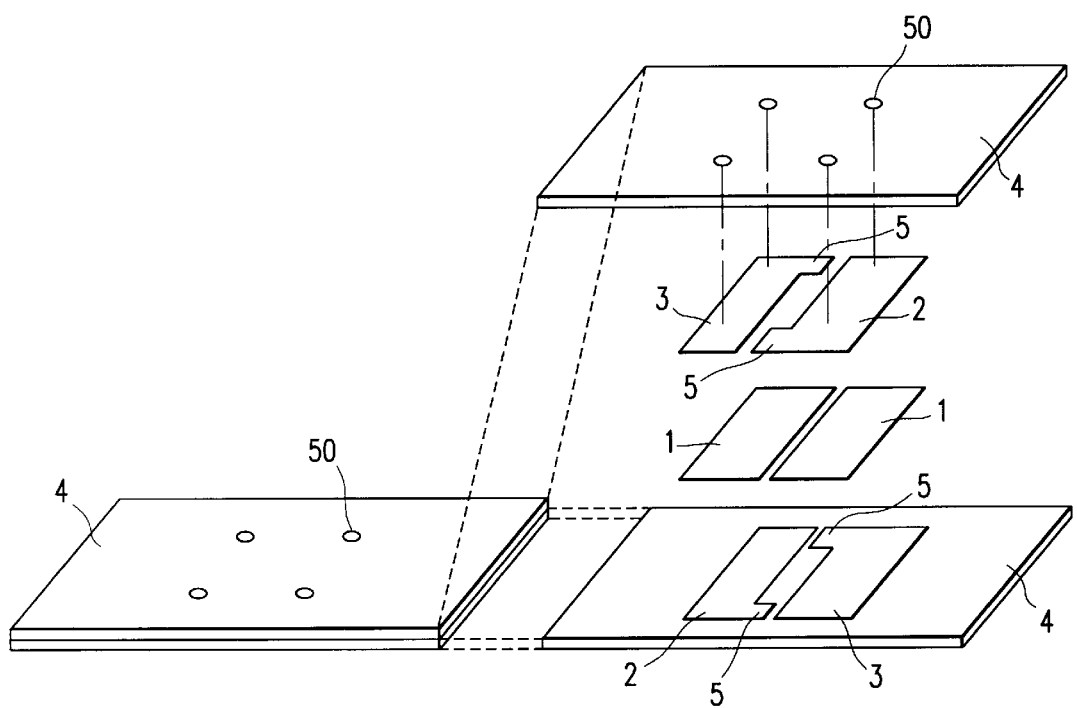
FIGS. 9A and 9B are perspective views illustrating a thin-film having capacitor elements incorporated in a substrate according to another embodiment of the present invention.
Figure 9B:
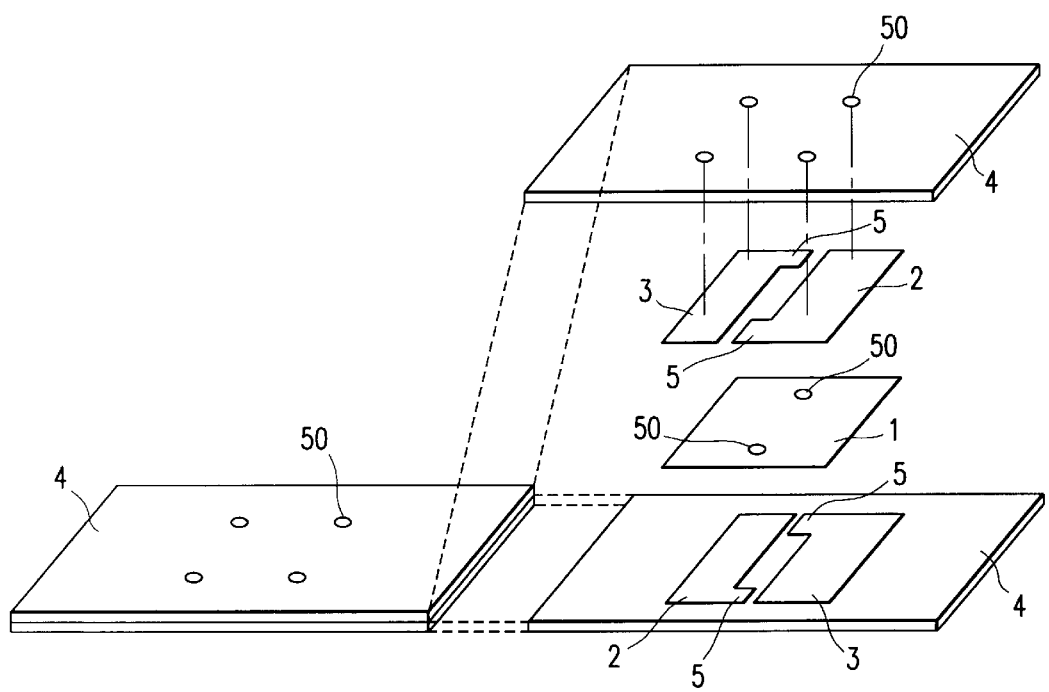

The above-mentioned thin-film capacitor of the present invention can be designed in a variety of ways. For instance, the thin-film capacitor shown in FIGS. 1 and 5 or the capacitor assembly shown in FIG. 6 can be incorporated in the substrate. This is shown in FIGS. 9A and 9B, where components similar to those of FIG. 1 are designated with the same reference numerals. In this case, the through-hole conductor 50 formed in the substrate can be used as an external electrode terminal or can be used for connecting the connection terminal electrode. The dielectric layer 1 is not limited to a rectangular shape only but may be of a square shape, a circular shape or of any other shape.

Excellent effects of the present invention will now be described by way of following Examples.

EXAMPLE 1

The electrode layers and dielectric layers were all formed based on a high-frequency magnetron sputtering method. An argon gas was introduced as a sputtering gas into a process chamber, and the pressure was maintained at 6.7 Pa by evacuation.

In the process chamber were installed a substrate holder and three target holders, so that three kinds of target materials could be sputtered. At the time of sputtering, the substrate holder was moved to a target position of a material with which the film was to be formed, and the distance between the substrate and the target was maintained to be 60 mm.

A high-frequency voltage of 13.56 MHz was applied across the substrate holder and the target from an external high-frequency power source, and a plasma of a high density was formed near the target based on a magnetron magnetic field established by a permanent magnet installed on the back surface of the target in order to sputter the surface of the target.

The high-frequency voltage can be applied to three targets independently. In this Example, the plasma was formed by applying the high-frequency voltage to only the target closest to the substrate. The substrate holder possessed a heating mechanism based on a heater, and the substrate temperature was controlled to remain constant while the film was being formed by sputtering.

Three kinds of metal masks having a thickness of 0.05 mm were installed on, the target side of the substrate mounted on the substrate holder, so that a required mask could be set onto the surface of the substrate for forming the film depending upon the pattern of the film.

First, a pair of electrode layers having connection terminal electrodes as shown in FIG. 4(a) were formed on a substrate of sintered alumina having a thickness of 0.25 mm by sputtering a platinum target using a first mask pattern. Then, a sintered $Pb(Mg_{1/3}Nb_{2/3})O_3$ was used as a target, a second mask pattern was set, and a pair of dielectric layers were formed as shown in FIG. 4(b) under the conditions of the substrate temperature of 535° C. and a high-frequency electric power of 200 watts. Next, a third mask pattern was set, and a pair of electrode layers were formed as shown in FIG. 4(c) by the sputtering of the platinum target. The electrode layers possessed total areas of 0.6 mm$^2$.

The thus prepared thin-film capacitor was measured for its impedance characteristics from 1 MHz up to 1.8 GHz by using an impedance analyzer (HP4291A manufactured by Hewlett-Packard Co.) to obtain a capacitance component of 12.5 nF and an inductance component of 150 pH. After the measurement, the cross section of the thin-film capacitor was observed by using an Scanning Election Microscopy (CEM) to find that each of the dielectric layers possessed a thickness of 0.3 µm.

Figure 8:
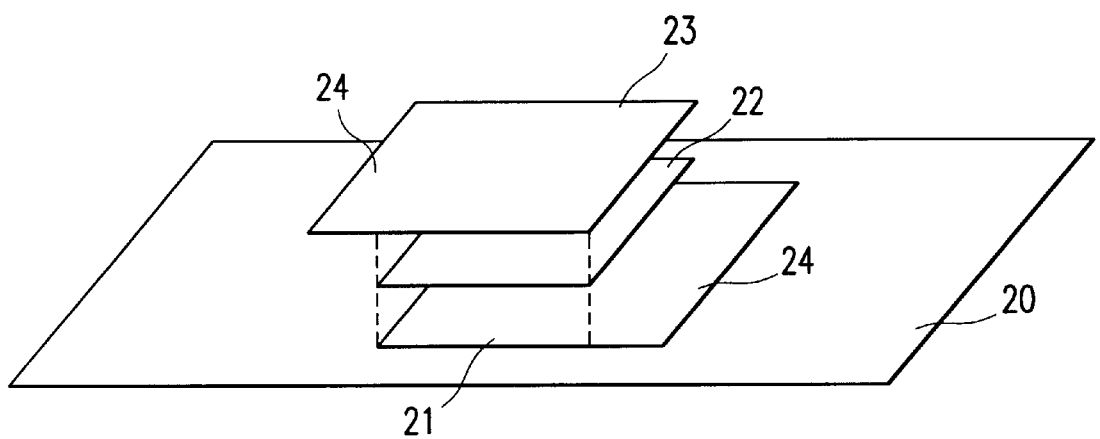
FIG. 8 is a view illustrating the structure of a conventional thin-film capacitor for comparison in the embodiment.

As a Comparative Example, a thin-film capacitor was prepared having a conventional general structure as shown in FIG. 8 but setting the conditions such as areas of the electrode layers and the like to be the same as those mentioned above, and was measured for its capacitance component and inductance component to be 12.6 nF and 380 pH, respectively. As shown in FIG. 8, the conventional thin-film capacitor was obtained by successively laminating a positive electrode layer 21, a dielectric layer 22 and a negative electrode layer 23 on the upper surface of a substrate 20, and the positive electrode layer 21 and the negative electrode layer 23 possessed capacitance take-out portions (terminals) 24 formed at positions of the sides opposite to each other.

EXAMPLE 2

A laminated-layer type thin-film capacitor having ten dielectric layers was prepared in quite the same manner as in Example 1 and was evaluated in the same manner as in Example 1 to obtain a capacitance component of 126.1 nF and an inductance component of 140 pH. After the measurement, the cross section of the laminated-layer type thin-film capacitor was observed by using an SEM to find that each of the dielectric layers possessed a thickness of 0.3 µm.

EXAMPLE 3

The substrate material, electrode material, method of forming electrodes, shapes and sizes thereof were quite the same as those of Example 1, but the dielectric film only was formed based on a sol-gel method. The films were formed by the sol-gel method according to a procedure as described below.

A magnesium acetate and a niobium ethoxide were weighed at a molar ratio of 1:2, refluxed in a 2-methoxyethanol (at 124° C. for 24 hours) to synthesize a MgNb composite alkoxide solution (Mg=4.95 mmol, Nb=10.05 mmol, 2-methoxyethanol=150 mmol). Next. 15 mmol of a lead acetate (anhydride) and 150 mmol of the 2-methoxyethanol were mixed together and were distilled off at 120° C. to synthesize a lead precursor solution.

The MgNb precursor solution (MgNb composite alkoxide solution) and the Pb precursor solution were mixed together at a molar ratio of Pb:(Mg+Nb)=1:1, and were stirred at room temperature to a sufficient degree to synthesize a $Pb(Mg_{1/3}Nb_{2/3})O_3$ (PMN) precursor solution.

The solution was diluted with about three times amounts of 2-methoxyethanol to obtain a coating solution. Then, the coating solution was applied by a spin coater onto the electrode layers, dried, and was heat-treated at 300° C. for one minute to form a gel film. Coating and heat-treatment of the coating solution were repeated, followed by firing at 830° C. for one minute (in the open air) to obtain a $Pb(Mg_{1/3}Nb_{2/3})O_3$ thin film.

A resist was applied onto the thus obtained thin dielectric film, and was exposed to light and developed through a step of photolithography. By using the resist as a mask, the wet etching was effected to pattern the dielectric film into a pattern same as that of Example 1 thereby to prepare a thin-film capacitor same as that of Example 1.

The thus prepared thin-film capacitor was measured for its impedance characteristics from 1 MHz up to 1.8 GHz in the same manner as in Example 1 to obtain a capacitance component of 50.2 nF and an inductance component of 160 pH. After the measurement, the cross section of the thin-film capacitor was observed by using an SEM to find that each of the dielectric layers possessed a thickness of 0.5 µm.

EXAMPLE 4

Four thin-film capacitors were formed in 4 rows×1 column in quite the same manner as in Example 1. The total area of the electrode layers was 2.4 mm².

The four thin-film capacitors were mounted on an evaluation board via solder bumps (connected to a conductor pattern in which two Au lines having a width of 0.3 mm were arranged maintaining a distance of 0.6 mm) to evaluate the electric properties. The solder bumps possessed a diameter of 0.2 mm and were formed in a number of two on each electrode layer. In this case, the capacitance take-out conductors (terminals) were Au lines.

The thus prepared thin-film capacitor assembly was measured for its impedance characteristics from 1 MHz up to 1.8 GHz in the same manner as in Example 1 to obtain a capacitance component of 51.2 nF and an inductance component of 50 pH. After the measurement, the cross section of the thin-film capacitor assembly was observed by using an SEM to find that each of the dielectric layers possessed a thickness of 0.3 µm.

As a Comparative Example, a thin-film capacitor assembly was prepared having a conventional general structure as shown in FIG. 8 but setting the conditions such as total area (2 mm×1.2 mm) and the like of the electrode layers to be the same as those mentioned above, and was measured for its capacitance component and inductance component to be 51.0 nF and 420 pH, respectively.

EXAMPLE 5

Two thin film capacitors C were arranged in 2 rows×1 column relying on the same method as in Example 4 and were evaluated in the same manner as in Example 1 to obtain a capacitance component of 25.4 nF and an inductance component of 95 pH.

EXAMPLE 6

Four thin film capacitors C were arranged in 2 rows×2 columns relying on the same method as in Example 4 and were evaluated in the same manner as in Example 1 to obtain a capacitance component of 51.2 nF and an inductance component of 50 pH. The capacitor elements arranged in 2 rows×2 columns were mounted on an evaluation board via solder bumps (connected to a looplike conductor pattern in which two Au lines having a width of 0.3 mm were arranged maintaining a distance of 0.6 mm) to evaluate the electric properties.

EXAMPLE 7

The evaluation board and the thin-film capacitor were connected together using an electrically conducting adhesive and Au bumps instead of the solder bumps in the same manner as in Examples 4 to 6. As a result, no difference was found in the capacitance component and in the inductance component compared with the connection based on the solder bumps in Examples 4 to 6.

EXAMPLE 8

The evaluation board and the thin-film capacitor were connected together by bonding Au wires of a diameter of 0.1 mm instead of the solder bumps in the same manner as in Examples 4 to 6. As a result, no difference was found in the capacitance component and in the inductance component compared with the connection based on the solder bumps in Examples 4 to 6.

EXAMPLE 9

A thin film capacitor assembly comprising laminated-layer type thin-film capacitors having ten dielectric layers was prepared in quite the same manner as in Example 4 and was evaluated in the same manner as in Example 1 to obtain a capacitance component of 508.2 nF and an inductance component of 50 pH. After the measurement, the cross section of the laminated-layer type thin-film capacitor assembly was observed by using an SEM to find that each of the dielectric layers possessed a thickness of 0.3 µm.

EXAMPLE 10

A thin film capacitor assembly was prepared by using the substrate material, electrode material, method of forming electrodes, shapes and sizes thereof, which were quite the same as those of Example 4, but the dielectric film only was based on a sol-gel method. The film was prepared by the sol-gel method in quite the same manner as in Example 3.

The thus prepared thin-film capacitor assembly was measured for its impedance characteristics from 1 MHz up to 1.8 GHz in the same manner as in Example 1 to obtain a capacitance component of 201.0 nF and an inductance component of 40 pH. After the measurement, the cross section of the laminated-layer type thin-film capacitor assembly was observed by using an SEM to find that each of the dielectric layers possessed a thickness of 0.5 μm.

What is claimed is:

1. A thin-film capacitor comprising a first capacitor element and a second capacitor element disposed substantially on the same plane and spaced apart from each other in a direction along the plane, wherein:

said first capacitor element includes a dielectric layer, a first electrode layer formed on an upper surface of said dielectric layer, and a second electrode layer formed on a lower surface of said dielectric layer and having a polarity different from that of said first electrode layer;

said second capacitor element includes a dielectric layer, a first electrode layer formed on a lower surface of said dielectric layer, and a second electrode layer formed on an upper surface of said dielectric layer; and said first electrode layers of said first capacitor element and said second capacitor element are electrically connected together, and said second electrode layers of said first capacitor element and said second capacitor element are electrically connected together, via connection terminal electrodes, respectively.

2. A thin-film capacitor according to claim 1, wherein said first and second capacitor elements, respectively, have a plurality of dielectric layers that are laminated alternatingly sandwiching either the first electrode layer or the second electrode layer.

3. A thin-film capacitor according to claim 1, wherein a resistor layer is formed on either an uppermost first electrode layer or the uppermost second electrode layer of either said first capacitor element or said second capacitor element.

4. A thin-film capacitor according to claim 1, wherein said first capacitor element and said second capacitor element are arranged on a predetermined substrate.

5. A thin-film capacitor according to claim 1, wherein said first capacitor element and said second capacitor element are incorporated in a predetermined substrate.

6. A capacitor assembly in which a plurality of thin-film capacitors of claim 1 are disposed on substantially the same plane and spaced part in a direction alone the plane, the first electrode layers of the thin-film capacitors are electrically connected together, and the second electrode layers of the thin-film capacitors are electrically connected together, via capacitance take-out conductors, respectively.

* * * * *